US012090862B2

(12) United States Patent
Hosey et al.

(10) Patent No.: US 12,090,862 B2
(45) Date of Patent: Sep. 17, 2024

(54) INTELLIGENT VEHICLE SYSTEMS AND CONTROL LOGIC FOR AUTOMATED THERMAL EVENT MITIGATION DURING VEHICLE TOWING

(71) Applicant: GM GLOBAL TECHNOLOGY OPERATIONS LLC, Detroit, MI (US)

(72) Inventors: Eric T. Hosey, Royal Oak, MI (US); Matthew Neely, Rochester, MI (US); Matthew E. Gilbert-Eyres, Rochester Hills, MI (US); Russell A Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 17/946,232

(22) Filed: Sep. 16, 2022

(65) Prior Publication Data
US 2024/0092175 A1    Mar. 21, 2024

(51) Int. Cl.
*B60L 3/00* (2019.01)
*B60L 3/06* (2006.01)
*B60L 58/24* (2019.01)
*B60Q 3/70* (2017.01)

(52) U.S. Cl.
CPC ......... *B60L 3/0007* (2013.01); *B60L 3/0046* (2013.01); *B60L 3/0061* (2013.01); *B60L 3/06* (2013.01); *B60L 58/24* (2019.02); *B60Q 3/70* (2017.02)

(58) Field of Classification Search
CPC .... B60L 3/0007; B60L 3/0046; B60L 3/0061; B60L 3/06; B60L 58/24; B60Q 3/70

USPC ......................................................... 701/400
See application file for complete search history.

(56) References Cited

U.S. PATENT DOCUMENTS

| | | |
|---|---|---|
| 4,350,026 A | 9/1982 | Klein |
| 6,889,515 B2 | 5/2005 | Tilton et al. |
| 6,955,063 B2 | 10/2005 | Adiga et al. |
| 8,329,325 B2 | 12/2012 | Brodie et al. |
| 8,383,260 B2 | 2/2013 | Essinger et al. |
| 8,429,899 B2 | 4/2013 | Gonze et al. |
| 8,435,668 B2 | 5/2013 | Kumar et al. |
| 8,563,154 B2 | 10/2013 | Graban et al. |
| 8,700,284 B2 | 4/2014 | Wojtkowicz et al. |
| 8,852,772 B2 | 10/2014 | McDonald |
| 8,862,283 B2 | 10/2014 | Kahler et al. |
| 8,951,654 B2 | 2/2015 | Sachdev et al. |

(Continued)

*Primary Examiner* — Isaac G Smith
(74) *Attorney, Agent, or Firm* — Quinn IP Law

(57) ABSTRACT

Presented are intelligent vehicle systems for thermal event mitigation during vehicle towing, methods for making/using such systems, and vehicles equipped with such intelligent control systems. A method of operating a host vehicle includes a resident or remote vehicle controller verifying the host vehicle is an incapacitated state. Responsive to the incapacitation of the host vehicle, the controller detects the host vehicle being towed by a tow vehicle and identifies a wireless-enabled portable computing device (PCD) within a predefined range of the host vehicle. Responsive to the host vehicle being towed, the controller determines if the wireless-enabled PCD is on the tow vehicle while towing the host vehicle. Upon detection of a thermal event in at least one battery cell in the host vehicle's battery system while the host vehicle is being towed, the controller responsively commands a resident vehicle subsystem to execute a control operation to mitigate the thermal event.

20 Claims, 2 Drawing Sheets

(56) References Cited

U.S. PATENT DOCUMENTS

| | | |
|---|---|---|
| 9,193,232 B2 | 11/2015 | Huntzicker |
| 9,196,939 B2 | 11/2015 | Christian et al. |
| 9,689,624 B2 | 6/2017 | Timmons et al. |
| 9,851,654 B2 | 12/2017 | Bryant et al. |
| 10,270,123 B2 | 4/2019 | Schilder et al. |
| 10,850,715 B1 * | 12/2020 | Decker, Jr. ............ B60T 8/1708 |
| 10,923,287 B1 | 2/2021 | Coppola et al. |
| 11,167,643 B2 | 11/2021 | Li et al. |
| 2009/0249807 A1 | 10/2009 | Nemesh et al. |
| 2011/0200860 A1 | 8/2011 | Brodie et al. |
| 2019/0357386 A1 | 11/2019 | Coppola et al. |
| 2021/0143652 A1 | 5/2021 | Ressler et al. |
| 2021/0234209 A1 | 7/2021 | Wang et al. |
| 2022/0097562 A1 | 3/2022 | Li et al. |
| 2022/0102780 A1 | 3/2022 | Hickey et al. |
| 2024/0025383 A1 * | 1/2024 | Treharne ......... B60W 30/18127 |

\* cited by examiner

INTELLIGENT VEHICLE SYSTEMS AND CONTROL LOGIC FOR AUTOMATED THERMAL EVENT MITIGATION DURING VEHICLE TOWING

INTRODUCTION

The present disclosure relates generally to electrochemical devices. More specifically, aspects of this disclosure relate smart vehicle systems and control logic for detecting and responding to severe thermal events in rechargeable traction battery packs.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds and ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise and may push the battery assembly towards an unstable state. Such thermal events, if left unchecked, may lead to a more accelerated heat-generating state called "thermal runaway", a condition in which the battery system is incapable of returning the internal battery components to normal operating temperatures. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels and pipes within the battery case. In contrast, direct liquid cooling systems—or "liquid immersion cooling" (LIC) systems—immerse the battery cells within a direct-conduction liquid dielectric coolant.

SUMMARY

Presented herein are intelligent vehicle systems with attendant control logic for automating thermal event mitigation during vehicle towing, methods for manufacturing and methods for operating such systems, and motor vehicles equipped with such intelligent control systems. For example, intelligent vehicle systems are disclosed for predicting the onset of a thermal runaway (TR) event in one or more battery cells of an in-vehicle battery pack. The onboard vehicle sensing and control network may monitor for and sense an oncoming TR event when the passenger compartment is not occupied and/or while the vehicle is disabled or keyed off. For instance, the vehicle may automate calibrated collision-event HV battery thresholds and TR mitigation procedures that limit or disable propulsion of the vehicle. In so doing, the vehicle occupants may be prompted to exit the passenger compartment and the restricted/disabled vehicle may be towed for service. Once disabled and vacated, the vehicle control system may employ any one of a suite of in-vehicle sensors (e.g., GPS transceiver, LiDAR/RADAR, digital cameras, tilt sensors, etc.) to detect the vehicle is being towed. A center-stack telematics unit, using short-range communication (SRC) or long-range communication (LRC) technologies, detects wireless-enabled devices within range of the vehicle and, once detected, identifies which of those devices are on the towing vehicle. The vehicle then broadcasts an electronic alert to these devices notifying them that the towed vehicle is likely to experience a severe thermal event.

Aspects of this disclosure are directed to vehicle control systems, system control logic, and memory-stored instructions for mitigating thermal events during vehicle towing. In an example, a method is presented for operating a host vehicle with a resident or remote vehicle controller or network of resident/remote vehicle controllers (collectively "controller") and a battery system having multiple battery cells. This representative method includes, in any order and in any combination with any of the above and below disclosed options and features: verifying, e.g., via the controller, an incapacitated state of the host vehicle, which includes the host vehicle being involved in a collision event and/or the host vehicle being deactivated; detecting, e.g., via the controller responsive to incapacitation of the host vehicle, the host vehicle being towed by a tow vehicle; identifying, e.g., via the controller using a wireless communications device, one or more wireless-enabled portable computing devices (PCD) within a predefined range of the host vehicle; determining, e.g., via the controller responsive to the host vehicle being towed, which of these wireless-enabled PCDs, if any, is on the tow vehicle while the tow vehicle is towing the host vehicle; detecting, e.g., via the controller, a predicted onset or occurrence of a thermal event in at least one of the battery cells of the vehicle battery system while the tow vehicle is towing the host vehicle; and transmitting, e.g., via the vehicle controller responsive to the predicted onset/occurrence of the thermal event, one or more command signals to one or more of the host vehicle's resident vehicle subsystems to execute one or more vehicle control operations to mitigate the thermal event.

Aspects of this disclosure are also directed to computer-readable media (CRM) for mitigating thermal events during vehicle towing. In an example, a non-transitory CRM stores instructions executable by one or more processors of a resident or remote vehicle controller or controller network. These instructions, when executed by the processor(s), cause the controller to perform operations, including: verifying an incapacitated state of a host vehicle, the incapacitated state including occurrence of a collision event with the host vehicle and/or a deactivation of the host vehicle; detecting, responsive to the incapacitated state of the host vehicle, the host vehicle being towed by a tow vehicle; identifying, via a wireless communications device, a wireless-enabled portable computing device within a predefined range of the host vehicle; determining, responsive to the host vehicle being towed, if the wireless-enabled PCD is on the tow vehicle while the tow vehicle is towing the host vehicle; detecting a predicted onset or occurrence of a thermal event in at least one battery cell in the host vehicle's battery system while the tow vehicle is towing the host vehicle; and transmitting, responsive to the predicted onset or occurrence of the thermal event, a command signal to a resident vehicle subsystem of the host vehicle to execute a vehicle control operation designed to mitigate the thermal event.

Additional aspects of this disclosure are directed to motor vehicles with intelligent vehicle systems executing control logic for mitigating thermal events during vehicle towing. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive applications, one or more electric traction motors operate alone (e.g., for FEV powertrains) or in conjunction with an internal combustion engine (e.g., for HEV powertrains) to selectively drive one or more of the road wheels to propel the vehicle. A rechargeable traction battery pack containing multiple battery cells is mounted onto the vehicle body and operable to power the traction motor(s).

Continuing with the preceding discussion, the vehicle is also equipped with a vehicle controller (e.g., single controller, network of controllers, resident/remote controller devices, etc.) that is programmed to verify the motor vehicle is in an incapacitated state, which may include occurrence of a collision event with the motor vehicle and/or deactivation of the motor vehicle. Responsive to the motor vehicle being incapacitated, the controller detects the motor vehicle being towed by a tow vehicle and identifies wireless-enabled PCDs, if any, within a predefined range of the motor vehicle. In response to the motor vehicle being towed, the controller determines if any of the previously identified wireless-enabled PCDs is on the tow vehicle while the tow vehicle is towing the motor vehicle. Upon detection of a predicted onset or occurrence of a thermal event in at least one of the vehicle battery cells while the motor vehicle is being towed, the controller commands one or more resident vehicle subsystems to execute one or more vehicle control operations designed to mitigate the thermal event.

For any of the disclosed systems, methods, and vehicles, determining a wireless-enabled PCD is on a tow vehicle while the tow vehicle is towing a host vehicle may include: determining that a distance between the wireless-enabled PCD and the host vehicle remains approximately the same while the tow vehicle is towing the host vehicle; and/or determining a speed of the wireless-enabled PCD is approximately equal to a speed of the host vehicle while the tow vehicle is towing the host vehicle. As another option, detecting a predicted onset or occurrence of a thermal event may include: first, estimating the predicted onset of the thermal event after the host vehicle is being towed; and, second, sensing the occurrence of the thermal event before transmitting a command signal to a resident vehicle subsystem of the host vehicle to mitigate the thermal event.

For any of the disclosed systems, methods, and vehicles, the vehicle controller may be programmed to respond to the detected incapacitation of the host vehicle by determining no wireless-enabled PCDs are within the predefined range of the host vehicle and/or determining the host vehicle is not being actively towed at that time. In either of these instances, the controller may thereafter detect the onset of a thermal event in the host vehicle's battery system and responsively transmit, e.g., to a first responder or a third-party host vehicle service, an electronic alert indicative of the thermal event. As another option, detecting the host vehicle is being towed may include: first, responding to incapacitation of the host vehicle by detecting onset of a tow event of the host vehicle by a tow vehicle; and, second, determining if the host vehicle has traveled at least a predefined minimum tow distance after the onset of the tow event. Optionally, detecting the onset of a vehicle tow event may include detecting physical attachment of the host vehicle to the tow vehicle and/or detecting movement of the host vehicle while the host vehicle is incapacitated.

For any of the disclosed systems, methods, and vehicles, deactivation of a host vehicle leading to an incapacitated state may include a user keying off and vacating the host vehicle and/or the vehicle controller disabling and/or restricting powertrain output of the host vehicle. As another option, a detected thermal event may take on various forms, including a thermal runaway event in which at least one of the battery cells is in an uncontrolled heat-generating cycle that is causing an unstable, self-heating state within the vehicle battery system. In another option, the vehicle controller may respond to detecting the occurrence of a thermal event by transmitting an electronic alert indicative of the thermal event to an owner or recent driver/occupant of the host vehicle.

For any of the disclosed systems, methods, and vehicles, the resident vehicle subsystem may include one or more electrical contactors that selectively connect/disconnect the battery system to/from a high-voltage electrical system of the host vehicle. In this instance, the control operation may include opening the electrical contactor(s) to thereby electrically disconnect the battery system from the HV electrical system. As another option, the resident vehicle subsystem may include a lighting component (e.g., headlamps) and/or an audio component (e.g., vehicle horn) of the host vehicle. In this instance, the control operation may include the lighting component and/or the audio component outputting a predefined visible/audible output that alerts occupants of the tow vehicle of the thermal event. As yet another option, the resident vehicle subsystem may include a telematics unit that is located inside the host vehicle's passenger compartment. In this instance, the control operation may include the telematics unit transmitting an electronic alert indicative of the thermal event to the wireless-enabled PCD.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
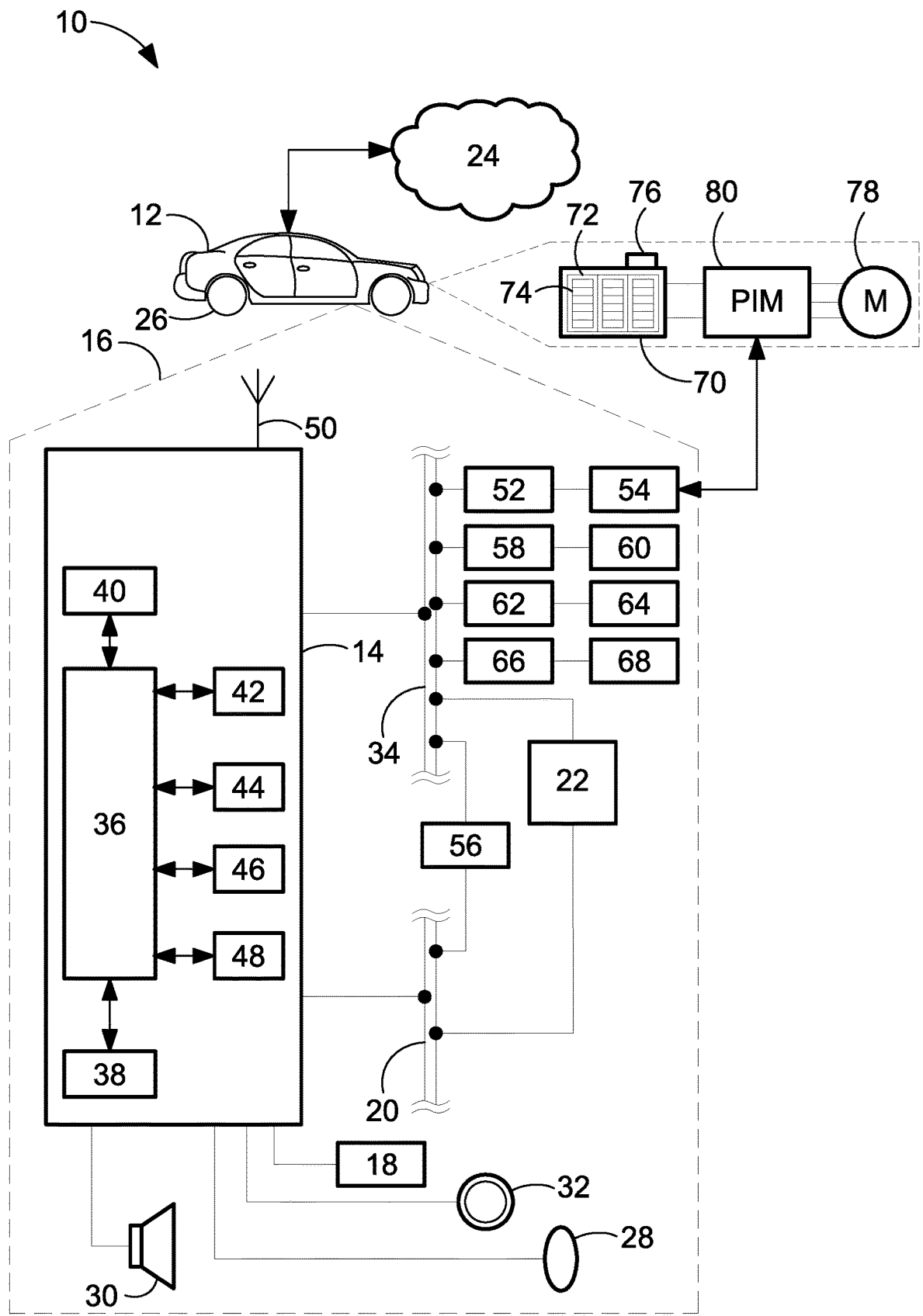
FIG. 1 is a schematic illustration of a representative motor vehicle with an electrified powertrain, a rechargeable traction battery pack, and a network of in-vehicle controllers, sensing devices, and communication devices for automating thermal event mitigation during vehicle towing in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain should also be appreciated as a non-limiting implementation of disclosed features. As such, it will be understood that aspects and features of this disclosure may be applied to other powertrain architectures, may be incorporated into any logically relevant type of vehicle, and may be employed for innumerable types of vehicle tow operations (e.g., chain and trailer towing, inclined towing, flatbed towing, etc.). Moreover, only select components of the motor vehicle and intelligent vehicle control system are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as body control module (BCM), an engine control module (ECM), a Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless internet protocol (IP) modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster of battery cells 74, such as lithium-class, zinc-class, nickel-class, or organo-silicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains. The battery pack 70 may be designed such that module management, cell sensing, module-to-module and/or module-to-host communication functionality is integrated directly into each battery module 72 and performed by an integrated electronics package, such as a wireless-enabled cell monitoring unit (CMU) 76.

Under anomalous operating conditions, the battery pack 70 may become damaged or may malfunction in a manner that causes the cells 74 inside the battery modules 72 to generate excessive heat, sometime in excess of 400-500° C. This thermal event may be in the nature of a thermal runaway event in which one or more of the electrochemical battery cells has undergone an internal failure and, thus, entered into an uncontrolled heat-generating cycle that causes an unstable self-heating state within the cell(s). A measured temperature spike within the cells 74 of the battery pack 70, in which an in-pack ATM cooling system is unable to control, may be indicative of a thermal runaway event. It is within the scope of this disclosure that a "thermal event" includes a thermal runaway event and other temperature-based events within a battery system (e.g., cooling resistance faults, internal thermal resistance faults, etc.). Moreover, any of an assortment of different techniques may be employed for detecting a thermal event within a traction battery pack, some examples of which are described in U.S. Pat. No. 8,429,899 B2, to Gonze et al., and U.S. Patent App. Pub. Nos. 2021/0234209 A1, to Wang et al., 2021/0143652 A1, to Ressler et al., and 2022/0097562 A1, to Li et al. All of the foregoing patent documents are incorporated herein by reference in their respective entireties and for all purposes.

Discussed below are intelligent vehicle systems with attendant control logic for automating thermal event mitigation during a vehicle tow operation of a host vehicle. Upon detection of a likely incapacitated host vehicle, for example, a resident or remote controller or network of resident/remote controllers may call-up and execute a memory-stored vehicle towing algorithm that employs a combination of vehicle data inputs to verify that the host vehicle is in-fact disabled and is in the process of being towed. For instance, a center-stack telematics module (e.g., telematics unit 14 of FIG. 1) may collaborate with a Body Control Module (BCM) and Camera Control Module (CCM) via a Sensor System Interface Module (SSIM) to aggregate sensor data from one or more or any combination of vehicle tilt sensors, GPS-transceivers, onboard cameras, subsystem diagnostic modules, etc., to determine that a host vehicle has been manually or automatically deactivated and is subject to a vehicle tow event. A diagnostics module may generate codes/vehicle bus signals that indicate activation of a "limp home mode" brought on, for example, by a powertrain fault, battery system fault, or collision event involving a host vehicle, which suggests the vehicle has been disabled. In addition, a vehicle tilt sensor may detect and output sensor data indicating that a front end or a rear end of a disabled host vehicle has been inclined at least about 40 degrees, which suggests the vehicle is about to be towed. A vehicle-mounted digital camera may capture images and output corresponding sensor data of an approaching or leading tow truck, which suggests the vehicle is about to be towed or is being actively towed. A GPS-transceiver may track and output sensor data indicative of host vehicle movement during ignition off, which suggests the vehicle is being actively towed. As yet another option, a wheel speed sensor may detect continuous rotation of a road wheel while the host vehicle is disabled, which also suggests the vehicle is being actively towed.

Upon detection of an incapacitated host vehicle, relevant information may then be passed to a telematics advisor and a vehicle owner in order to triage the situation and alert the tow company. For instance, the in-vehicle telematics module monitors a geofenced area surrounding the disabled host vehicle to detect all wireless-enabled devices, if any, within proximity to the host. Detected devices that stay wirelessly connected (e.g., via BLUETOOTH®, Wi-Fi, NFC, BLE, Ultra-wideband, etc.) to the telematics module and maintain a constant gap range with an actively towed host vehicle (e.g., within approximately 20-30 ft.) are isolated and categorized as target devices. If a severe thermal event in the host vehicle's battery system is predicted to occur or is live during active vehicle towing, the telematics module broadcasts an electronic voice, text, and/or push notification to some or all target devices, e.g., via AIRDROP®, NEARBY SHARE™ MYBRANDAPP™, GUARDIAN™, etc., to alert the tow truck driver, host vehicle driver/owner, and/or other relevant parties of the potential severity of the thermal event and, if desired, to instruct them to clear an immediate area surrounding the host vehicle.

Figure 2:
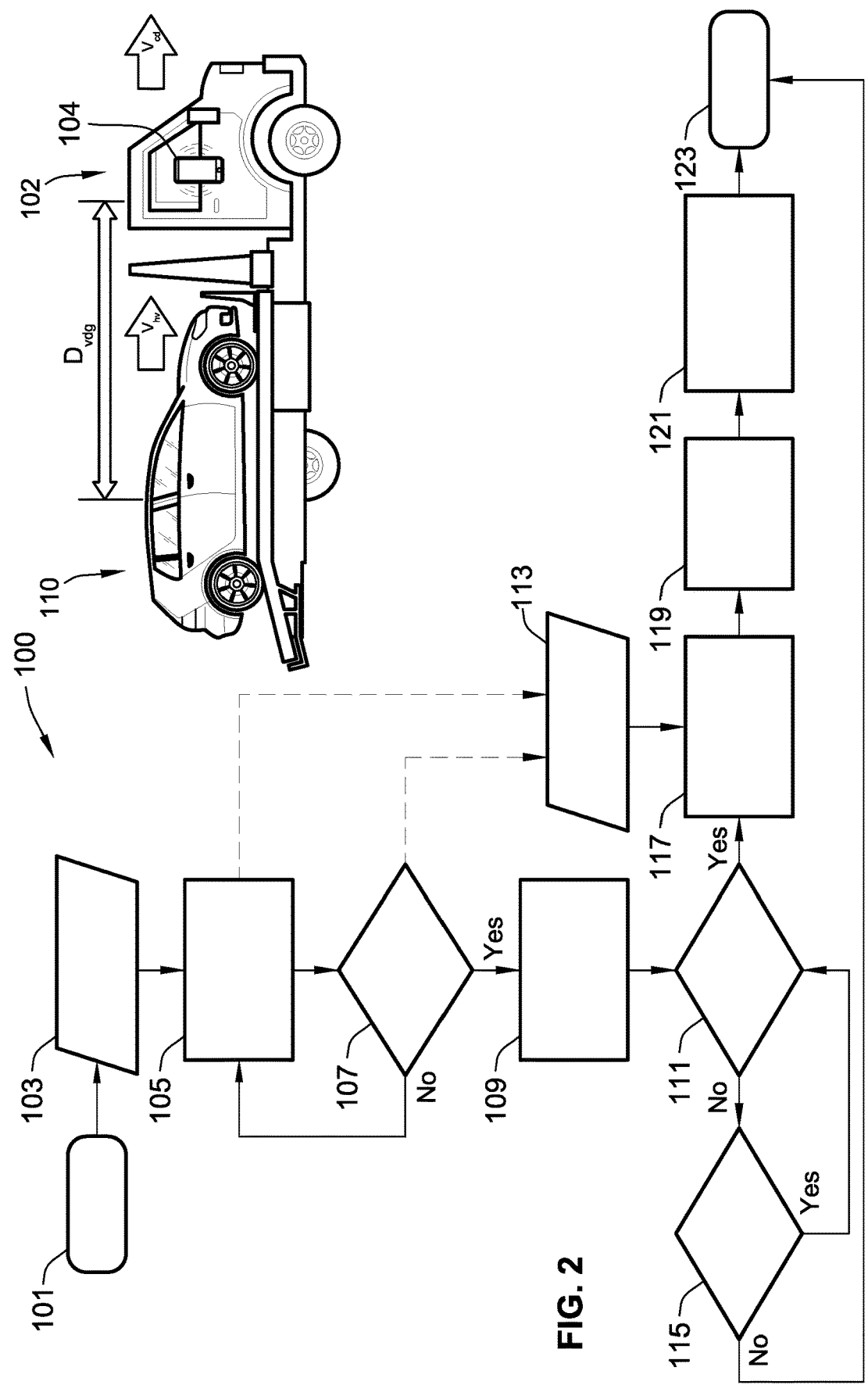
FIG. 2 is a flowchart illustrating a representative vehicle towing protocol for detecting and mitigating thermal events in a host vehicle during a tow event, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for automated thermal event sensing and mitigation of a host vehicle, such as vehicles 10 and 110 of FIGS. 1 and 2, that is subject to a tow event via a tow vehicle, such as tow truck 102 of FIG. 2, is generally described at 100 in accordance with aspects of the present disclosure. Although differing in appearance, it is envisioned that any of the features and options described above with respect to the vehicle 10 of FIG. 1 may be incorporated, singly or in any combination, into the vehicle 110 of FIG. 2, and vice versa. Some or all of the operations illustrated in FIG. 2 and described in further detail below may be representative of an algorithm that corresponds to non-transitory, processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the herein described operation blocks may be modified, combined, or eliminated.

Method 100 begins at START terminal block 101 of FIG. 2 with memory-stored, processor-executable instructions for a programmable controller or control module or similarly suitable processor to call up an initialization procedure for an incapacitated vehicle towing protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 101 may initialize responsive to a user command prompt (e.g., via input controls 32), a resident vehicle controller prompt (e.g., from telematics CPU 36), or a broadcast prompt signal received from an "off-board" centralized vehicle services system (e.g., host cloud computing service 24). By way of non-limiting example, the method 100 may initialize in response to detection of a user keying-off or otherwise disabling the host vehicle, manually or audibly selecting a VEHICLE TOW MODE option for the host vehicle, and vacating the passenger cabin. Method 100 may automatically initialize in response to a vehicle controller detecting a battery system fault or a collision event and responsively restricting or disabling propulsion of the host vehicle. In addition to user-borne manual incapacitation and controller-derived automated incapacitation, a host vehicle may be placed in an incapacitated state through an assortment of other active and passive means. Upon completion of some or all of the control operations presented in FIG. 2, the method 100 may advance to END terminal block 123 and temporarily terminate or, optionally, may loop back to terminal block 101 and run in a continuous loop.

From terminal block 101, method 100 advances to VEHICLE TOW EVENT data input block 103 to determine if the host vehicle is in the process of being towed and/or if the host vehicle is actively being towed by a tow vehicle. After verifying that the host vehicle has been placed in an incapacitated state at terminal block 101, for example, data input block 103 aggregates, pre-processes, and evaluates relevant vehicle data to detect the onset of a vehicle tow event of the host vehicle 110 by the tow truck 102. Onset of a vehicle tow event may be established by detecting physical attachment of a host vehicle to a tow vehicle (e.g., chaining the host vehicle 100 to the tow truck 102 or placing the host vehicle 100 onto the flatbed of tow truck 102). As another option, onset of a vehicle tow event may be recognized by detecting movement of the host vehicle while the host vehicle is incapacitated (e.g., tow truck 102 lifts the front end of the host vehicle 100 off the ground).

With continuing reference to FIG. 2, the method 100 transitions from data input block 103 to CONNECTED DEVICE IDENTIFICATION process block 105 to detect wireless-enabled devices, if any, within proximity to the incapacitated host vehicle. By way of non-limiting example, telematics unit 14 of FIG. 1 may employ any of the above-described LRC devices 44, SRC devices 46, DSRC components 48, and/or antennas 50 to identify at least one wireless-enabled portable computing device (PCD) (e.g., smartphone 104 of FIG. 2) that is within a predefined range of the host vehicle 110. For a vehicle collision event application, the incapacitated host vehicle 110 is now vacant and operatively attached to the tow truck 102; before the host is actively towed, telematics unit 14 may contemporaneously broadcast a wireless connection ping to all devices within a 30 ft. radius of the host vehicle 110 in order to locate at least the host vehicle driver's smartphone and the tow truck driver's smartphone. Once identified, the telematics unit 14 may also attempt to establish and maintain a wireless communications connection with select PCDs. By establishing a communications connection, the host vehicle 110 may confirm each PCD user's identity and exchange other relevant data with their device.

Prior to, contemporaneous with, or after identifying connected devices within range of the host vehicle at process block 105, method 100 executes ACTIVE VEHICLE TOWING decision block 107 to determine whether or not the host vehicle is now being actively towed by the tow vehicle. Upon the inception of a vehicle tow event, as detected at input data block 103, and the identification of proximally located wireless-enabled devices, as detected at process block 105, for example, the host vehicle 110 of FIG. 2 retrieves real-time vehicle dynamics data in an attempt to corroborate that it is being physically moved by the tow truck 102. For instance, the telematics unit 14 may employ a GPS transceiver to track the host vehicle's 110 tow origin location, tow destination location, and/or real-time or near real-time movement between the origin and destination locations. By tracking host vehicle movement, the telematics unit 14 may determine whether or not the host vehicle 110 has traveled at least a predefined minimum tow distance (e.g., at least about 50 ft) that intimates the vehicle is being actively towed. It is within the scope of this disclosure to eliminate data input block 103 or decision block 107 or, if desired, to combine blocks 103 and 107 such that a single assessment is made to determine if an incapacitated host vehicle is being towed, irrespective of whether or not the towing and towed vehicles are moving or stationary.

If the host/tow vehicle has not traveled at least the minimum tow distance (Block 107=NO), method 100 may loop back to process block 105 and continue to monitor for connected devices within range of the host vehicle 110 until active towing has commenced. Conversely, if no connected devices are identified before the host vehicle 110 is actively towed, the method 100 may continue to periodically execute process block 105 in an attempt to detect a connected device within range of the host vehicle, e.g., up until the host/tow vehicle arrives at the tow destination. Moreover, the host vehicle 110 may discover an active thermal event in its resident RESS after detecting the onset of a vehicle tow event for an incapacitated host vehicle (Block 103) even though it has not yet identified any connected devices within range of the host (Block 105) and/or it has not yet detected active vehicle towing (Block 107). INTERRUPT data input block 113 of FIG. 2, for example, acts as a bypass procedure that, upon detection of an active thermal runaway event, allows the method 100 to circumvent process blocks 105, 107, 109, and/or 111 after onset of a vehicle tow event but before detection of connected devices or commencement of active towing.

Responsive to verifying active towing of a host vehicle by a tow vehicle (Block 107=YES), method 100 executes CONNECTED DEVICE ISOLATION process block 109 to determine which of the wireless-enabled PCDs identified at process block 105, if any, is on the tow vehicle while the tow vehicle is actively towing the host vehicle. In accord with the illustrated methodology, for example, process block 109 may attempt to identify which of the wireless-enabled dPCDs (e.g., smartphone 104) are still within the predefined range of the host vehicle during active towing thereof. Similar techniques to those described above with respect to process block 105 for identifying connected devices may also be employed at process block 109 to isolate connected devices. In another option, process block 109 may determine a vehicle-to-device gap distance $V_{vdg}$ between the smartphone 104 and host vehicle 110 and, after active towing commences, verifying that this gap distance $V_{vdg}$ remains substantially the same while the tow vehicle 102 is towing the host vehicle 110. As another option, process block 109 may determine a real-time connected device speed or velocity $V_{cd}$ of the PCD 104 and a real-time vehicle speed or velocity $V_{hv}$ of the host vehicle 110. After active vehicle towing commences, process block 109 may verify that the connected device's speed/velocity $V_{cd}$ is approximately equal to the host vehicle's speed/velocity $V_{hv}$ while the tow vehicle 102 is towing the host 110.

Method 100 advances from process block 109 to THERMAL EVENT DETECTION decision block 111 to determine if a thermal event has occurred or is predicted to occur in at least one of the battery cells of the vehicle battery system while the tow vehicle is towing the host vehicle. In one example, decision block 111 may return a positive result (YES) and set a corresponding fault flag in response to forecasting a predicted onset of the TR event in the vehicle battery system (e.g., a medium-level thermal event) during active towing of the host vehicle 110. Additionally or alternatively, decision block 111 may return a positive result (YES) and set a corresponding fault flag in response to sensing an active thermal event in the vehicle battery system (e.g., a high-level thermal event) during active towing of the host vehicle 110. If a thermal event is not detected (Block 111=NO), method 100 will loop to decision block 115 to determine whether or not the host vehicle is still in active towing; if not (Block 115=NO), the method 100 will proceed to terminal block 123 and end. If active vehicle towing is still ongoing (Block 115=YES), the method 100 will loop back and forth between decision blocks 111 and 115 until either active vehicle towing is completed or a thermal event is detected.

Upon detecting a predicted onset of a thermal event or an occurrence of an active thermal event (Block 111=YES or INTERRUPT bypass 113 triggered), method 100 advances to FIRST RESPONDER ALERT process block 117 and responsively notifies one or more first responders—either directly from the host or through a third-party vehicle host service—of a severe thermal event during a tow event. By way of example, and not limitation, a telematics device (e.g., telematics unit 14) within the host vehicle 110 may transmit an electronic alert to local law enforcement and/or fire department notifying them that there is an expected/active thermal event and provide related information (e.g., host vehicle's make/model/color, host/tow vehicle's current location, tow destination, tow company information, nature of thermal event, etc.). A vehicle controller (e.g., CPU 36 of FIG. 1) may also, or alternatively, transmit host vehicle and thermal event data (e.g., via the wireless LRC device(s) 44) to a remote subscription-based back-office (BO) vehicle services provider (e.g., cloud computing host service 24) with a request for assistance. At VEHICLE OWNER ALERT process block 119, the host vehicle 110 may also transmit an electronic alert indicative of the thermal event to an owner of the host vehicle or other relevant party, assuming they are not one of the devices identified at process block 109.

Advancing from process block 119 to THERMAL EVENT MITIGATION process bock 121, the method 100 automates one or more remediating measures to help mitigate the detected thermal event. For instance, a telematics unit mounted inside the passenger compartment of the host vehicle 110 may transmit an electronic alert indicative of the thermal event to one, some, or all of the wireless-enabled PCDs identified at process block 105 and isolated at process block 109. In effect, the host vehicle 110 is attempting to warn at least the tow truck 102 driver and host vehicle 110 driver, both of whom may be inside the two truck's passenger cabin during host vehicle towing. Command signals may also be sent to one or more resident subsystems of the host vehicle 110 to execute one or more additional/alternative vehicle control operations each designed to mitigate the thermal event. For example, Electronic Battery Control Module 56 may command open one or more of the electrical contactors that function to selectively connect/disconnect the traction battery pack 70 to/from the vehicle's high-voltage (HV) electrical system. In so doing, the EBCM 56 electrically disconnects the electrical contactor(s) to thereby break the electrical connection between the battery system from the HV electrical system. As another option, a vehicle Light Control Module (LCM) or the vehicle Body Control Module may selectively activate a vehicle lighting component (e.g., headlamps) and/or a vehicle audio component (e.g., vehicle horn) to output a predefined visible and/or audible output designed to alert occupants of the tow vehicle of the thermal event.

In a specific yet non-limiting use-case scenario, a remote vehicle services provider (e.g., cloud computing host service 24) may have been employed to provide roadside assistance to a host vehicle for a prior event and, thus, may have direct knowledge of the host vehicle and the tow provider. In this instance, a customer service representative, advisor, or other staff member with the BO service provider that is presently handling a call for the host vehicle due to a thermal runaway event vehicle may assist with towing the host vehicle and may retrieve a prior-call history to determine the tow provider's information, which may then be used to contact the towing vehicle. The host vehicle may transmit a flag to the back-office services provider that indicates this vehicle is experiencing a thermal event and is currently being towed; there is logic in a BO server to then transmit relevant towing and towed vehicle information to the advisor (e.g., this is the vehicle that is being towed and this is the tow provider to contact).

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a host vehicle with a vehicle controller and a battery system having multiple battery cells, the method comprising:
   verifying, via the vehicle controller, an incapacitated state of the host vehicle including occurrence of a collision event with and/or a deactivation of the host vehicle;
   detecting, via the vehicle controller responsive to the incapacitated state of the host vehicle, the host vehicle being towed by a tow vehicle;
   identifying, via the vehicle controller using a wireless communications device, a wireless-enabled portable computing device (PCD) within a predefined range of the host vehicle;
   determining, via the vehicle controller responsive to the host vehicle being towed, if the wireless-enabled PCD is on the tow vehicle while the tow vehicle is towing the host vehicle;
   detecting, via the vehicle controller, a predicted onset or occurrence of a thermal event in at least one of the battery cells while the tow vehicle is towing the host vehicle; and
   transmitting, via the vehicle controller responsive to the predicted onset or occurrence of the thermal event, a command signal to a resident vehicle subsystem of the host vehicle to execute a vehicle control operation configured to mitigate the thermal event.

2. The method of claim 1, wherein determining the wireless-enabled PCD is on the tow vehicle while the tow vehicle is towing the host vehicle includes:
determining a distance between the wireless-enabled PCD and the host vehicle remains substantially unchanged while the tow vehicle is towing the host vehicle; and/or
determining a PCD speed of the wireless-enabled PCD is approximately equal to a vehicle speed of the host vehicle while the tow vehicle is towing the host vehicle.

3. The method of claim 1, wherein detecting the predicted onset or occurrence of the thermal event includes:
estimating the predicted onset of the thermal event after the host vehicle is being towed by the tow vehicle; and
sensing the occurrence of the thermal event before transmitting the command signal to the resident vehicle subsystem of the host vehicle.

4. The method of claim 1, further comprising:
determining, via the vehicle controller responsive to the incapacitated state of the host vehicle, no wireless-enabled PCDs are within the predefined range of the host vehicle;
detecting, via the vehicle controller after determining no wireless-enabled PCDs are within the predefined range of the host vehicle, inception of the thermal event in at least one of the battery cells in the battery system of the host vehicle; and
transmitting, via the vehicle controller to a third-party first responder responsive to detecting the onset of the thermal event, an electronic alert indicative of the thermal event.

5. The method of claim 1, further comprising:
determining, via the vehicle controller responsive to the incapacitated state of the host vehicle, the host vehicle is not being actively towed by the tow vehicle;
detecting, via the vehicle controller after determining the host vehicle is not being actively towed, inception of the thermal event in at least one of the battery cells; and
transmitting, via the vehicle controller to a third-party first responder responsive to detecting the onset of the thermal event, an electronic alert indicative of the thermal event.

6. The method of claim 1, wherein detecting the host vehicle is being towed by the tow vehicle includes:
detecting, responsive to the incapacitated state of the host vehicle, onset of a vehicle tow event of the host vehicle by the tow vehicle; and
determining, after the onset of the vehicle tow event, if the host vehicle has traveled at least a predefined minimum tow distance.

7. The method of claim 6, wherein detecting the onset of the vehicle tow event includes either one of: detecting physical attachment of the host vehicle to the tow vehicle, and detecting movement of the host vehicle while the host vehicle is in the incapacitated state.

8. The method of claim 1, wherein the deactivation of the host vehicle includes either one of: a user keying off and vacating the host vehicle, and the vehicle controller disabling and/or restricting powertrain output of the host vehicle.

9. The method of claim 1, wherein the thermal event includes a thermal runaway event in which the at least one of the battery cells is in an uncontrolled heat-generating cycle causing an unstable self-heating state.

10. The method of claim 1, further comprising transmitting, via the vehicle controller to an owner, recent driver, or recent occupant of the host vehicle responsive to detecting the occurrence of the thermal event, an electronic alert indicative of the thermal event.

11. The method of claim 1, wherein the resident vehicle subsystem includes an electrical contactor selectively connecting the battery system to a high-voltage (HV) electrical system of the host vehicle, and wherein the vehicle control operation includes opening the electrical contactor to thereby electrically disconnect the battery system from the HV electrical system.

12. The method of claim 1, wherein the resident vehicle subsystem includes a vehicle lighting component and/or a vehicle audio component of the host vehicle, and wherein the vehicle control operation includes the lighting component and/or the audio component outputting a predefined visible and/or audible output alerting occupants of the tow vehicle of the thermal event.

13. The method of claim 1, wherein the resident vehicle subsystem includes a telematics unit mounted to the host vehicle, and wherein the vehicle control operation includes the telematics unit transmitting to the wireless-enabled PCD an electronic alert indicative of the thermal event.

14. A non-transitory, computer-readable medium storing instructions executable by one or more processors of a vehicle controller of a host vehicle, the host vehicle including a battery system containing multiple battery cells, the instructions, when executed by the one or more processors, causing the vehicle controller to perform operations comprising:
verifying an incapacitated state of the host vehicle, the incapacitated state including occurrence of a collision event with the host vehicle and/or a deactivation of the host vehicle;
detecting, responsive to the incapacitated state of the host vehicle, the host vehicle being towed by a tow vehicle;
identifying, via a wireless communications device, a wireless-enabled portable computing device (PCD) within a predefined range of the host vehicle;
determining, responsive to the host vehicle being towed, if the wireless-enabled PCD is on the tow vehicle while the tow vehicle is towing the host vehicle;
detecting a predicted onset or occurrence of a thermal event in at least one of the battery cells in the battery system while the tow vehicle is towing the host vehicle; and
transmitting, responsive to the predicted onset or occurrence of the thermal event, a command signal to a resident vehicle subsystem of the host vehicle to execute a vehicle control operation configured to mitigate the thermal event.

15. A motor vehicle, comprising:
a vehicle body with a passenger compartment;
a plurality of road wheels attached to the vehicle body;
a traction motor attached to the vehicle body and operable to drive one or more of the road wheels to thereby propel the motor vehicle;
a battery system attached to the vehicle body and electrically connected to the traction motor, the battery system containing multiple battery cells; and
a vehicle controller programmed to:
verify an incapacitated state of the motor vehicle, the incapacitated state including occurrence of a collision event with the motor vehicle and/or a deactivation of the motor vehicle;

responsive to the incapacitated state of the motor vehicle, detect the motor vehicle being towed by a tow vehicle;

identify, via a wireless communications device, a wireless-enabled portable computing device (PCD) within a predefined range of the motor vehicle;

responsive to the motor vehicle being towed, determine if the wireless-enabled PCD is on the tow vehicle while the tow vehicle is towing the motor vehicle;

detect a predicted onset or occurrence of a thermal event in at least one of the battery cells while the tow vehicle is towing the motor vehicle; and responsive to the predicted onset or occurrence of the thermal event, transmit a command signal to a resident vehicle subsystem of the motor vehicle to execute a vehicle control operation configured to mitigate the thermal event.

16. The motor vehicle of claim 15, wherein determining the wireless-enabled PCD is on the tow vehicle while the tow vehicle is towing the motor vehicle includes:

determining a distance between the wireless-enabled PCD and the motor vehicle remains substantially unchanged while the tow vehicle is towing the motor vehicle; and/or determining a PCD speed of the wireless-enabled PCD is approximately equal to a vehicle speed of the motor vehicle while the tow vehicle is towing the motor vehicle.

17. The motor vehicle of claim 15, wherein detecting the predicted onset or occurrence of the thermal event includes:

estimating the predicted onset of the thermal event after the motor vehicle is being towed by the tow vehicle; and sensing the occurrence of the thermal event before transmitting the command signal to the resident vehicle subsystem of the motor vehicle.

18. The motor vehicle of claim 15, wherein detecting the host vehicle is being towed by the tow vehicle includes:

detecting, responsive to the incapacitated state of the host vehicle, onset of a vehicle tow event of the host vehicle by the tow vehicle; and determining, after the onset of the vehicle tow event, if the host vehicle has traveled at least a predefined minimum tow distance.

19. The motor vehicle of claim 15, wherein the deactivation of the host vehicle includes either one of: a user keying off and vacating the host vehicle, and the vehicle controller disabling and/or restricting powertrain output of the host vehicle.

20. The motor vehicle of claim 15, wherein the thermal event includes a thermal runaway event in which the at least one of the battery cells is in an uncontrolled heat-generating cycle causing an unstable self-heating state.

* * * * *